Figure 1:
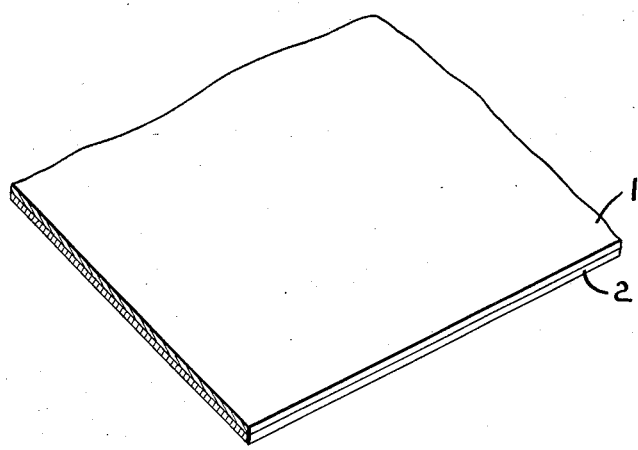

May 13, 1930.   K. L. MOSES   1,758,053
LAMINATED SHEET MATERIAL
Filed April 19, 1924

Inventor.
Kirke L. Moses
by Heard Smith Tennant
Attys.

Patented May 13, 1930

1,758,053

UNITED STATES PATENT OFFICE

KIRKE L. MOSES, OF BROOKLINE, MASSACHUSETTS

LAMINATED SHEET MATERIAL

Application filed April 19, 1924. Serial No. 707,737.

This invention relates to laminated sheet material and it has for its object to provide a novel material of this type which has excellent wearing qualities, which is flexible and which has other characteristics that make it excellently adapted to be used for automobile tops, upholstery, covering for different articles and for various other purposes for which rubberized cloth and various types of artificial leather are now commonly used.

One way of making such rubberized cloth and artificial leather is to apply to the surface of the cloth a coating material in plastic or viscous form, such, for instance, as rubber, or a rubber-containing compound, or an oil-containing compound, or nitro cellulose, thereby to produce a surface which is adapted to be embossed in imitation of leather or is adapted to various other treatments depending on the use to which the material is to be put.

While a product of this nature is flexible yet the coated surface does not always have good wearing qualities as it is apt to crack or flake off and it is also often easily deeply marked or scratched through to the fabric base. It is also often easily abraded by a blunt instrument.

By my invention I provide a sheet material which may be embossed and surface finished as advantageously as the coated cloth which is now generally used for making artificial leather, but which has the further advantage that the surface thereof has excellent wearing qualities and cannot be as readily injured by abrasion and wear as the usual coating applied to cloth in the manufacture of artificial leather.

The wearing surface of a product embodying my invention is formed by a layer of paper having rubber incorporated therein, such layer being firmly united to a layer of cloth or fabric thus making a laminated structure, one layer of which is formed by the cloth backing and the other layer of which is formed by the paper product having the rubber incorporated therein.

The paper product which I prefer to use is one in which the rubber ingredient is so incorporated in the paper body as to form a practically homogeneous combination of interlaced fibre and rubber. A paper having this characteristic has excellent wear qualities due to its structure and it has a surface which has high resistance to abrasion.

A laminated sheet, therefore, formed with the cloth backing and the wear surface of paper having the above-named characteristics has many advantages, when wearing qualities are considered, over a cloth to which coating in plastic form is applied.

I find excellent results are secured by using a paper product such as shown in my Patent No. 1,489,330, dated April 8th, 1924. Such a paper product is one which is made in the first instance relatively porous and then is saturated with latex or some rubber compound. Owing to the porosity of the paper a relatively large percent of the latex or rubber compound will be absorbed by the paper and thus a paper product will be produced which has a much larger rubber content than would be possible if the rubber were mixed with the paper fibres before they were formed into the paper web. This larger content of rubber produces a very tough product having excellent wear qualities.

In making a laminated sheet embodying my invention the paper layer and the cloth backing are preferably united by some adhesive which may be applied to one of the layers only or to both layers depending somewhat upon the character of the adhesive used. With some adhesives it may be sufficient if one face of either the cloth backing or the paper layer is provided with a coating of adhesive before the two layers are united. With other adhesives, and especially with an adhesive containing rubber or rubber containing latex, it is desirable to apply the adhesive to one face of each layer and after the adhesive has been dried sufficiently the two layers may be placed together with the coated faces in contact and then firmly united by pressure. This pressure may be readily secured by running the two juxtaposed layers between squeeze rolls.

The laminated sheet may be given waterproof qualities by employing an adhesive of the proper kind for uniting the two layers together and/or by suitable surface treatment.

An artificial leather made in accordance with my invention has higher tear-resisting qualities than an artificial leather made by applying a plastic coating to cloth backing, because the product made in accordance with my invention embodies the strength of both the cloth backing and the layer of paper which has rubber incorporated therein.

My improved laminated sheet is very flexible and because of the characteristic of the paper layer will withstand repeated bending without cracking or breaking. The paper layer also forms an excellent wear surface for the laminated sheet as stated above.

In the drawings wherein I have shown more or less diagrammatically a laminated product embodying my invention and the steps of manufacturing it, Fig. 1 indicates a product embodying my invention.

Figure 2:
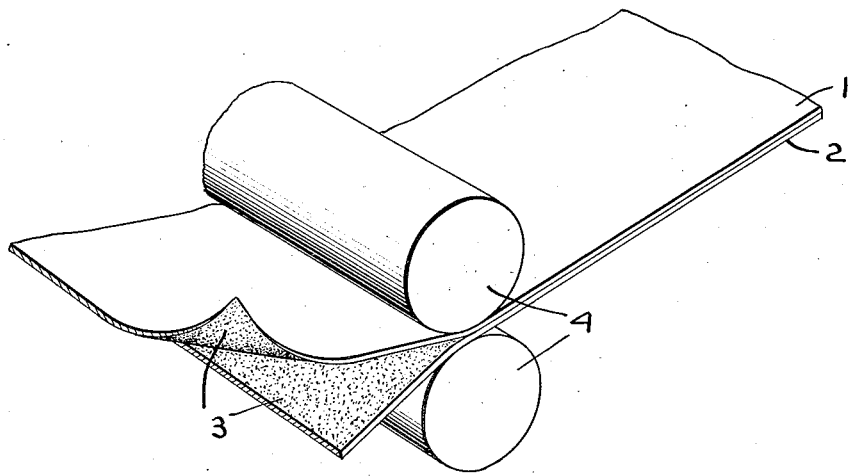

Fig. 2 illustrates one way of uniting the two layers.

In the drawings 2 indicates a sheet or web of cloth and 1 indicates a sheet or web of paper product having rubber incorporated therein. One face of each of these sheets is shown as provided with a coating 3 of some suitable adhesive such for instance as rubber cement and when the adhesive is in a proper condition the two layers are placed with their coated faces in face-to-face contact and are then pressed together by running them between squeeze rolls 4 which firmly and intimately unite the layers thus making a laminated sheet of the character described.

The process herein shown, however, is only illustrative of one way of making the laminated sheet and the invention is not limited to this particular method.

I claim.

1. A laminated sheet material, one layer constituting the wear surface and being a homogenous layer of interlaced fibre and rubber, and the other layer being of cloth and constituting a reinforcing backing, said two layers being united by an adhesive containing rubber.

2. A two-ply sheet material adapted for use with artificial leather, one ply of which presents a tough wear-resisting surface and is constituted by a layer of paper which is made with relatively high porosity and after being formed is saturated with a rubber compound thereby to produce a homogeneous layer of interlaced fibres and rubber with a high percentage of rubber, and the other ply being of cloth and constituting a backing ply, said plies being adhesively and intimately united together by an adhesive containing rubber.

In testimony whereof, I have signed my name to this specification.

KIRKE L. MOSES.